United States Patent [11] 3,627,814

[72] Inventor Tomas L. Fridinger
 Woodbury Township, Washington County, Minn.
[21] Appl. No. 11,870
[22] Filed Feb. 16, 1970
[45] Patented Dec. 14, 1971
[73] Assignee Minnesota Mining and Manufacturing Company
 St. Paul, Minn.

[54] ALKYL CARBAMATE DERIVATIVES OF α-HYDROXYACETOPHENONE OXIME
 5 Claims, No Drawings
[52] U.S. Cl. .................................................. 260/482 C,
 260/566 A, 424/300
[51] Int. Cl. ....................................................... C07c 131/00
[50] Field of Search ........................................... 260/482 C,
 482 B

[56] References Cited
UNITED STATES PATENTS
3,560,555 2/1971 Fuchs.......................... 260/482

*Primary Examiner*—James A. Patten
*Assistant Examiner*—Paul J. Killos
*Attorney*—Kinney, Alexander, Sell, Steldt & Delahunt ABSTRACT: N-alkyl- and N,N-dialkylcarbamates of α-hydroxyacetophenone oxime wherein both the oxime group and the hydroxy group are carbamoylated have insecticidal activity. The bis-(alkyl carbamates) may be prepared in one step by reaction of an excess of alkyl isocyanate with α-hydroxyacetophenone oxime, while the unsymmetrical carbamates are prepared e.g. by a series of steps in which the latter compound is e.g. reacted first with slightly more than one equivalent of one isocyanate, and then with an excess of a different isocyanate.

ALKYL CARBAMATE DERIVATIVES OF α-HYDROXYACETOPHENONE OXIME

BACKGROUND OF THE INVENTION

This invention relates to bis(N-substituted carbamates) of alkyl aryl ketones, and more particularly to derivatives of α-hydroxyacetophenone oxime and processes for their preparation.

α-Hydroxyacetophenone oxime is known to the chemical art, but so far as is known, there has been no report of bis(N-substituted carbamate) derivatives of this compound prior to the invention.

SUMMARY OF THE INVENTION

The present invention relates to compounds of Formula I

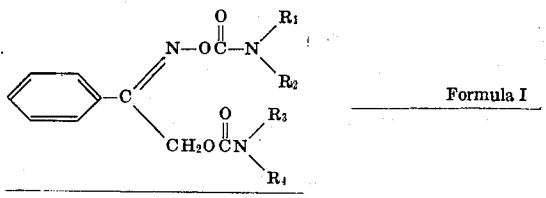

Formula I wherein $R_1$ is methyl or ethyl, $R_2$ is hydrogen, methyl or ethyl, $R_3$ is straight or branched chain alkyl of one to four carbon atoms and $R_4$ is hydrogen or straight or branched chain alkyl of one to four carbon atoms. The compounds have insecticidal activity.

Compounds of the invention are prepared by the reaction of α-hydroxyacetophenone oxime with well-known carbamoylating agents such as alkyl isocyanates, N,N-dialkylcarbamoyl chloride or reaction with phosgene followed by reaction with a primary or secondary amine.

The new compounds can be formulated into standard insecticidial compositions as described in further detail hereinafter.

Compounds of the invention wherein $R_1$ is methyl and $R_2$ is hydrogen or methyl are presently preferred.

Compounds of the invention wherein $R_1$ is methyl, $R_2$ is methyl or hydrogen, $R_3$ is methyl and $R_4$ is methyl or hydrogen are more specifically preferred.

It is well known in the art that oximes may exist in two geometrical isomeric forms known as the syn and antiforms. It has been found that α-hydroxyacetophenone oxime exists in two separable isomeric forms, one of which is reported in the chemical literature (Anal. Chem. Acta. 13, 501, 1955) as melting at 69°–70° C. This isomer is reported to form a chelate with copper. It is prepared and purified as described in the reference hereinabove. It has been found that another isomer of α-hydroxyacetophenone oxime can be prepared and purified as described in example 1 which has much higher melting point (119°–122°C.).

When insecticidal bis(N-substituted carbamates) are prepared from the high melting isomer, their insecticidal activity is higher than when the low melting isomer is used. Based on this evidence, it is preferred that the insecticidal compounds of the present invention be prepared from the high melting isomer of α-hydroxyacetophenone oxime, or mixtures of isomers which are chiefly the high melting isomer.

The insecticidal activity of the compounds of the present invention is determined using standard screening methods. Compounds of the invention are insecticidally active against at least one of several species of insects, such as houseflies, bollweevils and corn rootworms, at dosages of 500 p.p.m. or less.

One compound of the invention, α-hydroxyacetophenone oxime bis(methylcarbamate), has been found to be particularly effective as a selective systemic insecticide against bollweevils without phytotoxicity against cotton, and for this reason it is presently the preferred compound of the invention.

The compounds of this invention may be applied to insects, upon infested plants and soil, or may be formulated into insecticidal compositions by preparing solutions or dispersions of the active agent in one or more of the common solvents normally used as a carrier. Thus, for example, the active agents may be dissolved in organic liquids such as ketones (acetone, methyl ethyl ketone, etc.), amides(dimethylacetamide, dimethylformamide, etc.), hydrocarbons such as benzene, toluene and xylene, alcohols and glycols, and various oxygen-containing industrial organic solvents and the like.

Dispersions may also be prepared by diluting the organic solvent system with water in the presence or absence of a surface active agent, and the formulations of the invention may also be employed in aerosol formulations where difluorodichloromethane and similar aerosol propellants are used to form the propellant and dispersion.

Likewise, the active agent may be formulated into dusts and powders or preferably granules. The inert carrier for wettable powders will be a clay such as fuller's earth, china clay, kaolin, attapulgite, pentonite and the related aluminum silicates. Suitable carriers for granular formulations are corn cob, walnut shell, vermiculite and the like, and will contain the active ingredient at a concentration ranging from about 0.5 percent to about 95 percent by weight of the total formulation. Other finely divided inorganic solids may also be used as a carrier, and in general, dusts prepared for this type of formulation will have a particle size below about 200 mesh and contain the active ingredient at a concentration ranging from about 0.5 to about 90 percent by weight of the total formulation.

The formulations are sprayed or dusted in the usual manner onto the particular substrate to be protected against insect attack. Preferably they are applied with e.g. cotton seeds, in the furrow, while seeding, when systemic bollweevil control is desired.

The concentration of active agent in the formulations will vary widely depending upon the particular compound and upon the particular method of application. In general, formulations containing from about 0.1 to about 95 percent by weight will be used. The compounds of this invention are applied to soil as a solution or in the form of granules when systemic activity is desired.

The α-hydroxyacetophenone oxime isomers are prepared from the known compound α-hydroxyacetophenone by oximination as described in example 1 and the reference hereinabove. The method of example 1 is an adaptation of known techniques. It provides the high melting isomer in good purity. The compounds of the invention are prepared from α-hydroxyacetophenone oxime using well-known chemical methods, hereinafter described as processes A, B and C.

Process A.

α-Hydroxyacetophenone oxime reacts stepwise with $R_1$-and $R_2$-containing alkyl isocyanates to form the bis(N-monoalkyl-carbamate) derivatives. The oxime group has been found to react first, and very readily, in this stepwise reaction in the presence of a basic catalyst and in inert solvent solution. A slight molar excess of isocyanate will react at reflux in less than 1 hour to give a good yield of the compound wherein the oxime is carbomoylated. This intermediate can then be reacted with an excess of the same or another alkyl isocyanate in an inert solvent, together with a catalyst, for several hours to several days at reflux to give a compound of the invention wherein $R_1$ is methyl or ethyl, $R_3$ is a straight or branched chain alkyl group of one to four carbon atoms and $R_2$ and $R_4$ are hydrogen.

Process B.

The α-hydroxyacetophenone oxime alkylcarbamate is reacted with an N,N-dialkyl carbamoyl chloride stepwise as in process A or with two equivalents of the N,N-dialkyl carbamoyl chloride.

Process C.

The starting compound is reacted with phosgene to form an intermediate chloroformoyl or bis-chloroformoyl compound, which is then reacted with a primary or secondary amine having the selected $R_1$, $R_2$, $R_3$ or $R_4$ alkyl groups, to form the desired alkyl carbamate derivative. The reaction can be carried out in one or two steps as in Processes A and B.

The necessary alkyl isocyanate, alkylcarbamoyl chloride, and alkylamine intermediates are known to the art.

If a symmetrical compound of the invention is desired, i.e., where the same alkyl carbamate residue is present in both positions, it is apparent that one simply reacts α-hydroxyacetophenone oxime with excess alkyl isocyanate, or N,N-dialkylcarbamoyl chloride, or with phosgene, then with the selected amine.

Basic catalysts useful to promote the reaction of isocyanates with oximes and/or alcohols are well known to the art. Triethylamine is generally satisfactory for the present invention. Solvents for this reaction are nonreactive, and suitable solvents for this reaction include alkyl ketones such as acetone and methyl ethyl ketone, aromatic hydrocarbons such as benzene and toluene and chlorinated hydrocarbons such as dichloromethane and chloroform. Acetone has been generally satisfactory for preparing experimental quantities of compounds of the invention.

The reactions using N,N-dimethylcarbomoyl chloride and phosgene followed by an amine are preferably carried out in the presence of a tertiary amine acid acceptor. It is possible to react N,N-dimethylcarbamoyl chloride using excess triethylamine as both solvent and acid acceptor.

When a stepwise reaction of phosgene or N,N-dimethylcarbomoyl chloride is desired, it is preferable, in order to maximize yields of the desired compounds, to run the equimolar reaction initially at low temperatures, e.g. −70° to −100° C. The reaction mixture is allowed to warm to room temperature or higher as the reaction nears completion.

The following examples are given for the purpose of illustrating the invention, and are not intended to be limiting thereof. All melting points are uncorrected.

EXAMPLE 1

A stirred mixture of α-hydroxyacetophenone (13.6 g., 0.10 mole), hydroxylamine hydrochloride (7.6 g., 0.11 mole), sodium bicarbonate (9.2 g., 0.11 mole) and 150 ml. of absolute ethanol is heated to reflux temperature and maintained at this temperature for 1 day. The mixture is cooled, filtered and the filtrate evaporated in vacuo. The residue, a mixture of isomers, is extracted with 75 ml. of diethyl ether, and the ether is evaporated to give a solid residue which is fractionally recrystallized twice from benzene, then from a hexane-chloroform mixture, to give α-hydroxyacetophone oxime, a white solid, m.p. 119°—122° C.

Anal. Calculated for $C_8H_9NO_2$:  c, 63.6; H, 6.0; N, 9.3
Found: C, 63,5; H, 5,8; N, 9.3.

EXAMPLE 2

To a stirred solution of α-hydroxyacetophenone oxime, m.p. 117°—121° C. (2.9 g., 0.02 mole) and 4 drops of triethylamine in 100 ml. of acetone is added, dropwise, methyl isocyanate (2.3 g., 0.04 mole) in 30 ml. of acetone. The mixture is refluxed for 6 hours, cooled, then the volatile portion is evaporated in vacuo. The residue is recrystallized twice from hexane-chloroform and twice from acetone-hexane mixtures, to give α-hydroxyacetophenone oxime bis(methylcarbamate), a white solid, m.p. 107°—109° C. Elemental analysis was consistent with the assigned structure.

EXAMPLE 3

Using the method of example 2, α-hydroxyacetophenone oxime is reacted with ethyl isocyanate to give α-hydroxyacetophenone oxime bis(ethylcarbamate).

EXAMPLE 4

To a cold stirred solution of α-hydroxyacetophenone oxime (5.0 g., 0.033 mole) and 4 drops of triethylamine in 80 ml. of acetone is added, dropwise, methyl isocyanate (2.1 g., 0.036 mole) in about 20 ml. of acetone. The mixture is heated at reflux temperature for 1 hour, then the volatile portion is evaporated in vacuo. The residue is triturated with hexane, then a small amount of diethyl ether is added, and the mixture is cooled with Dry Ice to give a sticky solid. Recrystallization from a hexane-chloroform mixture gives α-hydroxyacetophenone oxime methylcarbamate. The infrared spectrum of this product is consistent with the assigned structure.

EXAMPLE 5

Using the method of Example 4 α-hydroxyacetophenone oxime is reacted with ethyl isocyanate to give α-hydroxyacetophenone oxime ethylcarbamate. Similarly, when dimethyl or diethyl carbamoyl chloride is used in place of ethyl isocyanate, α-hydroxyacetophenone oxime-dimethyl carbamate and -diethyl carbamate are respectively obtained.

EXAMPLE 6

To 100 ml. of cold (Dry Ice-cooled), stirred petroleum ether containing 5.0 g. of α-hydroxyacetophenone oxime are added 3.3 g. (about 2.4 ml., 0.033 mole) of phosgene. The mixture is stirred cold for about 2 hours and then permitted to warm slowly to room temperature. To the reaction mixture are then added 3.135 g. (0.033 mole) of methylethylamine hydrochloride, and the mixture is made slightly alkaline by dropwise addition of 5 percent aqueous sodium hydroxide. Stirring is continued, with further addition of sodium hydroxide solution if necessary, to maintain alkaline conditions. The reaction mixture is allowed to stand 24 hours at room temperature; then the aqueous layer is separated, and the petroleum ether solution is washed with water. The petroleum ether solution is then evaporated to dryness in vacuo, and the residue is taken up in warm hexane. α-Hydroxyacetophenone oxime N-methyl-N-ethyl carbamate thus produced is purified by recrystallization from hexane-ethanol mixture.

EXAMPLE 7

To a stirred solution of α-hydroxyacetophenone oxime methyl carbamate in acetone and a few drops of triethylamine is added dropwise ethyl isocyanate in acetone. The mixture is refluxed for one day, cooled, then the volatile portion is evaporated in vacuo, to give α-ethylcarbamoyloxyacetophenone oxime methyl carbamate.

The following table shows additional compounds of the invention and the method for their preparation.

TABLE I

| Ex. No. | Starting materials | Reactants | Process | Product |
|---|---|---|---|---|
| 8 | φC=N—OCNHC$_2$H$_5$<br>  ‖<br>  O<br>  \|<br>CH$_2$OH | CH$_3$NCO | A | φC=NOCNHC$_2$H$_5$<br>  ‖<br>  O<br>  \|<br>CH$_2$OCNCH$_3$<br>  ‖ H<br>  O |

TABLE I – Continued

| Ex. No. | Starting materials | Reactants | Process | Product |
|---|---|---|---|---|
| 9 | φC(=N—OCNHCH₃)CH₂OH (C=O) | n-C₃H₇NCO | A | φC(=N—OCNHCH₃)CH₂OCNHC₃H₇ |
| 10 | φC(=N—OCNHCH₃)CH₂OH | t-C₄H₉NCO | A | φC(=N—OCNHCH₃)CH₂OCNHt—C₄H₉ |
| 11 | φC(=N—OCN(CH₃)₂)CH₂OH | CH₃NCO | A | φC(=N—OCN(CH₃)₂)CH₂OCNHCH₃ |
| 12 | φC(=N—OCNHCH₃)CH₂OH | (C₂H₅)₂NCOCl | B | φC(=N—OCNHCH₃)CH₂OCN(C₂H₅)₂ |
| 13 | φC(=N—OCN(CH₃)₂)CH₂OH | n-C₄H₉NCO | A | φC(=N—OCN(CH₃)₂)CH₂OCNHn—C₄H₉ |
| 14 | φC(=N—OCN(CH₃)(C₂H₅))CH₂OH | CH₃NCO | A | φC(=N—OCN(CH₃)(C₂H₅))CH₂OCNHCH₃ |

What is claimed is:

1. A compound of the formula

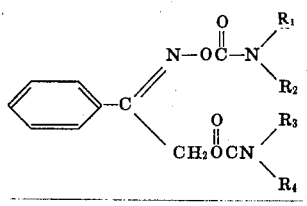

wherein R₁ is methyl or ethyl, R₂ is hydrogen, methyl or ethyl, R₃ is straight or branched chain alkyl of one to four carbon atoms and R₄ is hydrogen or straight or branched chain alkyl of one to four carbon atoms.

2. Alkyl carbamates of α-hydroxyacetophenone oxime according to claim 1, in which the α-hydroxyacetophenone oxime residue is the high-melting isomer.

3. A compound according to claim 1, wherein R₁ is methyl and R₂ is hydrogen or methyl.

4. A compound according to claim 3, wherein R₃ is methyl and R₄ is hydrogen or methyl.

5. The compound α-hydroxyacetophenone oxime bis(methylcarbamate) according to claim 1.

* * * * *